(12) United States Patent
Xu (10) Patent No.: US 9,362,833 B2
(45) Date of Patent: *Jun. 7, 2016

(54) CONSTANT VOLTAGE CONSTANT CURRENT CONTROL CIRCUITS AND METHODS WITH IMPROVED LOAD REGULATION

(71) Applicant: Silergy Semiconductor Technology (Hangzhou) LTD, Hangzhou, ZheJiang Province (CN)

(72) Inventor: Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 58 days.

This patent is subject to a terminal disclaimer.

(21) Appl. No.: 14/518,196

(22) Filed: Oct. 20, 2014

(65) Prior Publication Data

US 2015/0062979 A1 Mar. 5, 2015

Related U.S. Application Data

(63) Continuation of application No. 13/781,512, filed on Feb. 28, 2013, now Pat. No. 8,913,404.

(30) Foreign Application Priority Data

Mar. 26, 2012 (CN) .......................... 2012 1 0082610

(51) Int. Cl.
*H02M 3/335* (2006.01)
*H02M 1/00* (2006.01)

(52) U.S. Cl.
CPC ...... *H02M 3/33507* (2013.01); *H02M 3/33523* (2013.01); *H02M 2001/0032* (2013.01); *Y02B 70/16* (2013.01)

(58) Field of Classification Search
CPC ................... H02M 1/4258; H02M 2001/0032; H02M 2001/0009
See application file for complete search history.

(56) References Cited

U.S. PATENT DOCUMENTS

| 7,239,532 | B1 * | 7/2007 | Hsu | H02M 3/33523 363/21.12 |
|---|---|---|---|---|
| 7,362,592 | B2 * | 4/2008 | Yang | H02M 3/33507 363/21.13 |
| 8,279,631 | B2 * | 10/2012 | Yang | H02J 7/0072 363/20 |
| 2005/0024898 | A1 * | 2/2005 | Yang | H02M 3/33507 363/21.12 |
| 2005/0073859 | A1 * | 4/2005 | Fukumoto | H02M 1/32 363/16 |
| 2005/0146903 | A1 * | 7/2005 | Yang | H02M 3/33507 363/21.15 |
| 2005/0162143 | A1 * | 7/2005 | Fukumoto | H02M 1/4225 323/284 |
| 2006/0034102 | A1 * | 2/2006 | Yang | H02M 3/33507 363/21.13 |

(Continued)

*Primary Examiner* — Timothy J Dole
*Assistant Examiner* — Yusef Ahmed
(74) *Attorney, Agent, or Firm* — Michael C. Stephens, Jr.

(57) ABSTRACT

The present invention discloses CVCC circuits and methods with improved load regulation for an SMPS. In one embodiment, the CVCC can include: a voltage feedback circuit to generate an output voltage feedback signal; a current feedback circuit to generate an output current feedback signal; a control signal generating circuit that receives the output voltage feedback signal and the output current feedback signal, and generates a constant voltage/constant current control signal; a first enable signal generating circuit that compares a first reference voltage and the constant voltage/constant current control voltage to generate a first enable signal; and a PWM controller that generates a PWM control signal based on the constant voltage/constant current control signal to control a main switch of the flyback SMPS.

20 Claims, 10 Drawing Sheets

(56) References Cited

U.S. PATENT DOCUMENTS

| | | | | |
|---|---|---|---|---|
| 2006/0050539 A1* | 3/2006 | Yang | H02M 3/33523 | 363/21.16 |
| 2007/0103134 A1* | 5/2007 | Yang | H02M 3/33523 | 323/282 |
| 2007/0133234 A1* | 6/2007 | Huynh | H02M 3/33507 | 363/20 |
| 2009/0206814 A1* | 8/2009 | Zhang | H02M 3/33507 | 323/284 |
| 2010/0061126 A1* | 3/2010 | Huynh | H02M 3/33507 | 363/21.12 |
| 2010/0164446 A1* | 7/2010 | Matsuo | H02M 3/158 | 323/282 |
| 2010/0194463 A1* | 8/2010 | Moon | H02M 1/32 | 327/427 |
| 2010/0208500 A1* | 8/2010 | Yan | H02M 3/33523 | 363/21.12 |
| 2010/0301821 A1* | 12/2010 | Kung | H02M 3/33523 | 323/283 |
| 2010/0308733 A1* | 12/2010 | Shao | H02M 1/4225 | 315/119 |
| 2011/0018516 A1* | 1/2011 | Notman | H02M 3/1588 | 323/284 |
| 2011/0051472 A1* | 3/2011 | Zhang | H02M 3/33507 | 363/21.18 |
| 2011/0157924 A1* | 6/2011 | Huynh | H02M 3/33507 | 363/21.15 |
| 2011/0157936 A1* | 6/2011 | Huynh | H02M 3/33507 | 363/78 |
| 2011/0261596 A1* | 10/2011 | Zong | H02M 3/33507 | 363/21.13 |
| 2011/0286248 A1* | 11/2011 | Wang | H02M 3/33507 | 363/21.18 |
| 2012/0170330 A1* | 7/2012 | Yang | H02M 1/4258 | 363/21.13 |
| 2012/0201063 A1* | 8/2012 | Sugawara | H02M 1/4225 | 363/89 |
| 2012/0262961 A1* | 10/2012 | Chien | H02M 3/33507 | 363/84 |
| 2013/0027988 A1* | 1/2013 | Yang | H02M 3/33507 | 363/21.15 |
| 2013/0135905 A1* | 5/2013 | Yeh | H02M 3/33507 | 363/21.01 |
| 2013/0148387 A1* | 6/2013 | Ren | H02M 1/36 | 363/21.16 |
| 2013/0223108 A1* | 8/2013 | Xu | H02M 3/33507 | 363/21.17 |
| 2013/0250629 A1* | 9/2013 | Xu | H02M 3/33523 | 363/21.17 |
| 2013/0294118 A1* | 11/2013 | So | H02M 3/33507 | 363/21.16 |
| 2013/0308350 A1* | 11/2013 | Huang | H02M 3/33523 | 363/21.16 |
| 2014/0036548 A1* | 2/2014 | Yang | H02M 3/335 | 363/21.07 |
| 2014/0071714 A1* | 3/2014 | Li | H02M 3/33507 | 363/16 |
| 2014/0211516 A1* | 7/2014 | Kung | H02M 3/33523 | 363/21.13 |
| 2014/0211519 A1* | 7/2014 | Hsu | H02M 1/4258 | 363/21.17 |

* cited by examiner

CONSTANT VOLTAGE CONSTANT CURRENT CONTROL CIRCUITS AND METHODS WITH IMPROVED LOAD REGULATION

RELATED APPLICATIONS

This application is a continuation of the following application, U.S. patent application Ser. No. 13/781,512, filed on Feb. 28, 2013, and which is hereby incorporated by reference as if it is set forth in full in this specification, and which also claims the benefit of Chinese Patent Application No. 201210082610.1, filed on Mar. 26, 2012, which is incorporated herein by reference in its entirety.

FIELD OF THE INVENTION

The present invention relates to the field of switch mode power supply (SMPS), and more specifically to constant voltage constant current control (CVCC) circuits and methods with improved load regulation.

BACKGROUND

Switch mode power supply (SMPS) may be characterized as small volume, light weight, high power conversion efficiency, etc., and SMPS has been widely used in industrial automation, instruments and meters, medical facilities, liquid crystal display (LCD), communication apparatus, audio-visual products, digital products, and other fields. SMPS is a power supply that utilizes modern power electronics to control a ratio of a switch's on time and off time, so as to remain the output of the power supply substantially steady. Usually, electronic devices, such as MOSFETs controlled by pulse-width modulation (PWM) are used in SMPS circuits.

SUMMARY

In one embodiment, a constant voltage constant current (CVCC) circuit for a switch mode power supply (SMPS), can include: (i) a voltage feedback circuit configured to generate an output voltage feedback signal; (ii) a current feedback circuit configured to generate an output current feedback signal; (iii) a control signal generating circuit configured to receive the output voltage feedback signal and the output current feedback signal, and to generate a constant voltage/constant current control signal; (iv) a first enable signal generating circuit configured to compare a first reference voltage and the constant voltage/constant current control signal to generate a first enable signal; and (v) a pulse-width modulation (PWM) controller configured to generate a PWM control signal based on the constant voltage/constant current control signal to control a main switch of the flyback SMPS, where the PWM control signal is configured to turn on the main switch when the first enable signal is inactive, and wherein the main switch remains off when the first enable signal is active.

In one embodiment, a method can include: (i) obtaining an output current feedback signal and an output voltage feedback signal; (ii) generating a constant voltage/constant current control signal based on the output current feedback signal and the output voltage feedback signal; (iii) generating a first enable signal based on the constant voltage/constant current control signal and a first reference voltage; (iv) controlling a main switch of the flyback SMPS based on the first enable signal, where the main switch is turned off by the first enable signal when the first enable signal is active; (v) generating, in a first operation mode, a PWM control signal based on the constant current control signal to control the main switch to maintain substantially constant output current; and (vi) generating, in a second operation mode, the PWM control signal based on the constant voltage control signal, where the PWM control signal is used to control the main switch when the first enable signal is inactive.

Embodiments of the present invention can advantageously provide several advantages over conventional approaches. For example, particular embodiments can provide CVCC control circuits and methods with improved load regulation, and that have a simplified circuit structure, relatively small volume, and relatively low product cost. In addition, when under light load or even a no-load state, the main switch of the SMPS can be turned off to avoid power loss. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
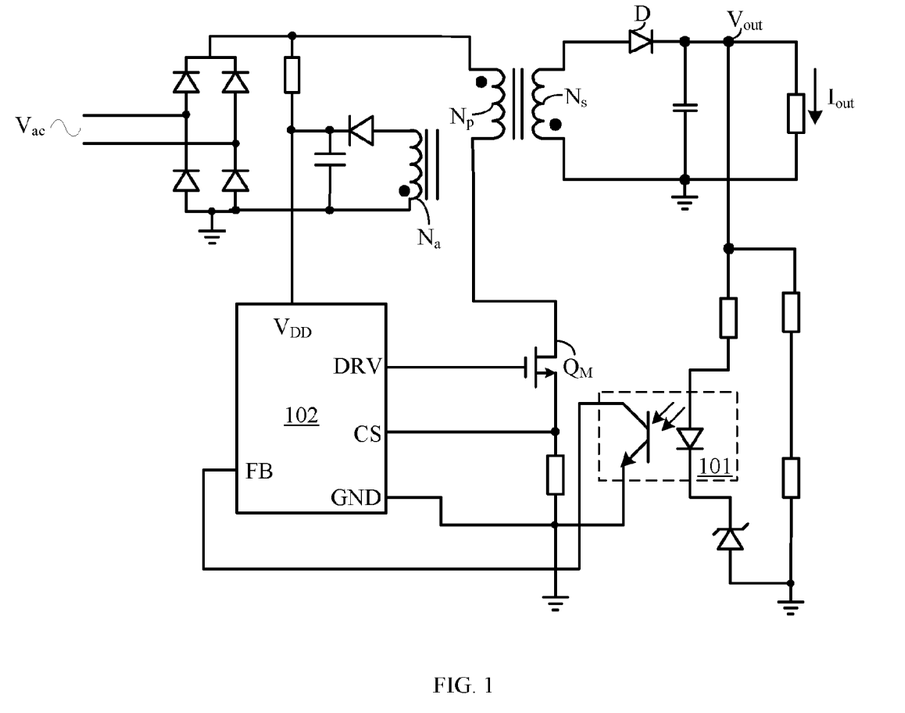
FIG. 1 is a schematic diagram of an example flyback SMPS.

In a common switch mode power supply (SMPS) arrangement, a flyback converter can achieve substantially constant voltage or constant current output by applying a secondary-side control circuit to control a main switch of the power circuit. With reference to FIG. 1, shown is a schematic diagram of an example flyback SMPS. The flyback SMPS can control main switch $Q_M$ by secondary-side feedback control circuit 102 to realize substantially constant voltage or constant current output. For example, an output voltage signal and an output current signal of the flyback SMPS can be detected by voltage sampling resistors, current sampling resistors, and opto-coupler 101. Secondary-side feedback control circuit 102 can be used to process the detected voltage signal and current signal, and to generate a corresponding control signal to control main switch $Q_M$. In this way, the flyback SMPS can generate substantially constant voltage output $V_{out}$ or constant current output $I_{out}$.

The constant voltage constant current (CVCC) circuit can include secondary-side feedback control circuit 102, and opto-coupler 101, used to detect the feedback signal. However, the use of opto-coupler 101 may be difficult to integrate with other circuit portions, and may thus increase overall circuit volume and product cost. Also, in many practical applications, when the load of the main circuit is reduced to a certain extent (e.g., becomes a "light" load), the primary-side circuit may still transfer energy to the output terminal, resulting in power loss.

In particular embodiments, constant voltage constant current (CVCC) control circuits and methods with improved load regulation, can include: a voltage feedback module/circuit, a current feedback module/circuit, a control signal generating module/circuit, a first enable signal generating module/circuit, and a pulse-width modulation (PWM) controller. The control signal generating module can control the flyback SMPS operating in a constant voltage or constant current state, and generate a constant voltage/constant current control signal. The PWM controller can generate a PWM control signal based on the constant voltage/constant current control signal to control the main switch. The CVCC control circuit can achieve substantially constant current control and constant voltage control through select control, so the circuit structure can be relatively simple. Also, when the example CVCC control circuit is operating under a light load or even a no-load state, the main switch can be turned off by the enable signal to stop energy from being transferred from the input side to avoid associated power loss.

In one embodiment, a CVCC circuit for a SMPS, can include: (i) a voltage feedback circuit configured to generate an output voltage feedback signal; (ii) a current feedback circuit configured to generate an output current feedback signal; (iii) a control signal generating circuit configured to receive the output voltage feedback signal and the output current feedback signal, and to generate a constant voltage/constant current control signal; (iv) a first enable signal generating circuit configured to compare a first reference voltage and the constant voltage/constant current control signal to generate a first enable signal; and (v) a PWM controller configured to generate a PWM control signal based on the constant voltage/constant current control signal to control a main switch of the flyback SMPS, where the PWM control signal is configured to turn on the main switch when the first enable signal is inactive, and wherein the main switch remains off when the first enable signal is active.

Figure 2:
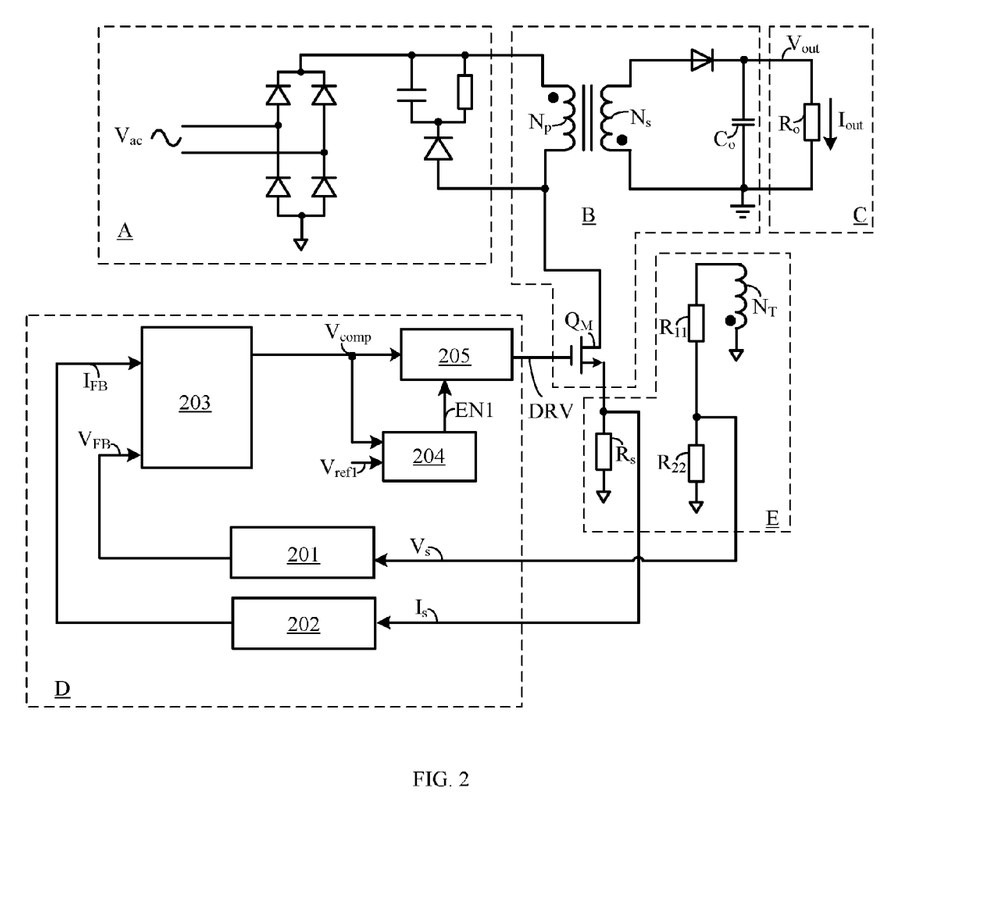
FIG. 2 is a block diagram of a first example power supply controlled by a CVCC control circuit in accordance with embodiments of the present invention.

Particular embodiments can provide a CVCC control circuit with improved load regulation for a flyback SMPS. Referring now to FIG. 2, an example CVCC control circuit can include voltage feedback module 201, current feedback module 202, control signal generating module 203, first enable signal generating module 204, and PWM controller 205. As used herein, a "module" can include a circuit or circuit portion, such as a circuit integrated on an integrated circuit (IC), or a separate IC or other device, such as may be integrated on a printed-circuit board (PCB).

The CVCC control circuit can generate a corresponding control signal to control main switch $Q_M$ of the power supply by processing output voltage feedback signal $V_{FB}$ and output current feedback signal $I_{FB}$. The operation mode of the flyback SMPS can be controlled to achieve substantially constant voltage output $V_{out}$ and/or substantially constant current output $I_{out}$ of the SMPS. For example, the flyback converter can include primary winding $N_p$, secondary winding $N_s$, and auxiliary winding $N_T$. In this example, secondary winding $N_s$ can be coupled to the load.

Voltage feedback module 201 can generate output voltage feedback signal $V_{FB}$, and current feedback module 202 can generate output current feedback signal $I_{FB}$. Control signal generating module 203 can receive output voltage feedback signal $V_{FB}$ and output current feedback signal $I_{FB}$, and may generate constant voltage/constant current control signal $V_{comp}$. First enable signal generating module 204 can compare reference voltage $V_{ref1}$ and constant voltage/constant current control signal $V_{comp}$ to generate enable signal EN1.

PWM controller 205 can generate a PWM control signal based on constant voltage/constant current control signal $V_{comp}$ to control main switch $Q_M$ of the flyback SMPS. For example, when enable signal EN1 is inactive (e.g., a logic low level), the PWM control signal can be used to turn on or otherwise control main switch $Q_M$. However, when enable signal EN1 is active (e.g., a logic high level), main switch $Q_M$ may be off. In other examples, EN1 may be active to remain main switch $Q_M$ on, and may be inactive to allow the PWM control signal to effectively control main switch $Q_M$. The particular enable single control state and main switch on, off, or other control states, can depend on the type of main switch $Q_M$ (e.g., PMOS or NMOS transistor), as well as the logic gates utilized in the control circuitry. Particular embodiments are amenable to any such type of enable-based control or enable/disable function of main switch $Q_M$.

In particular embodiments, the example CVCC control circuit can control the output of the SMPS without an opto-coupler. As a result, the circuit structure can be much simpler and easier to be implemented, and the circuit volume can be relatively small as compared to conventional approaches. Also, when the operation is under a light load or even a no-load state, main switch $Q_M$ can be turned off to prevent associated power loss.

Figure 3:
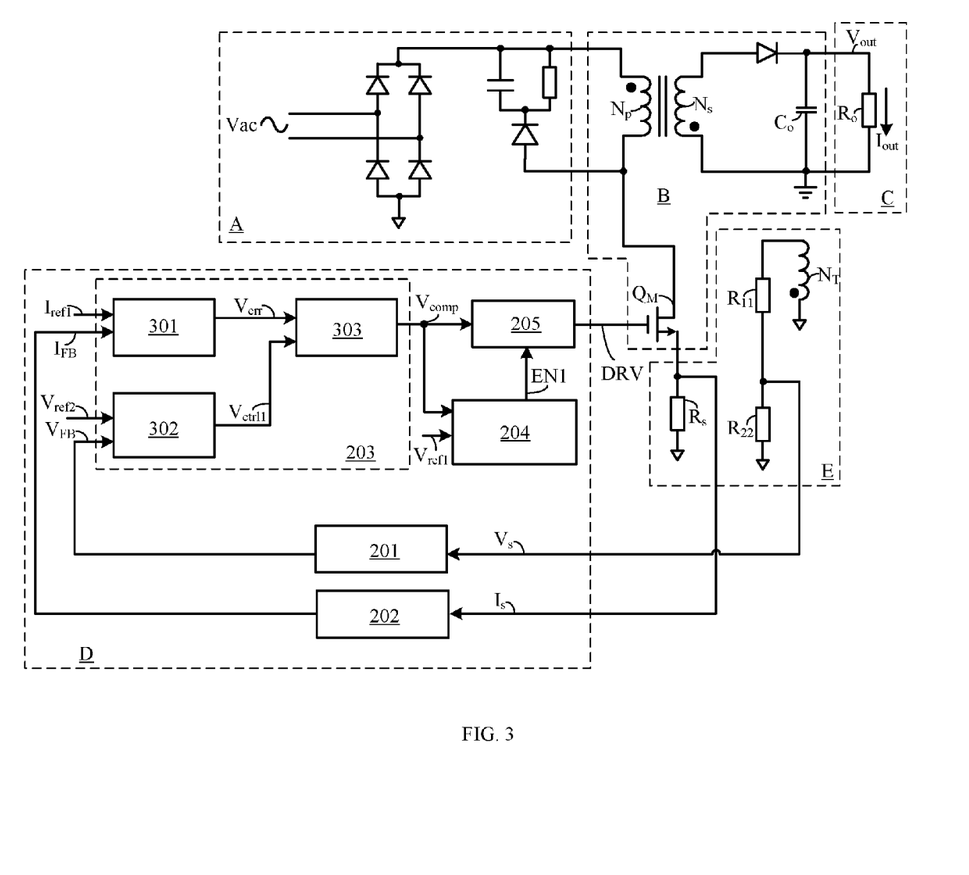
FIG. 3 is a block diagram of a second example power supply controlled by a CVCC control circuit in accordance with embodiments of the present invention.

Referring now to FIG. 3, shown is a specific implementation of control signal generating module 203 of CVCC control circuit. For example, control signal generating module 203 can include current controller 301 that can calculate a difference between output current feedback signal $I_{FB}$ and reference current $I_{ref1}$, so as to generate error signal $V_{err}$. Voltage controller 302 can compare output voltage feedback signal $V_{FB}$ against reference voltage $V_{ref2}$, so as to generate control signal $V_{ctrl1}$. Also, select controller 303 can generate constant voltage/constant current control signal $V_{comp}$ to control the flyback SMPS to operate in a constant voltage mode or a constant current mode based on control signal $V_{ctrl1}$ and error signal $V_{err}$.

The following will describe example operation procedure with reference to various portions of the example circuit of FIG. 3. The flyback SMPS with substantially steady output can be controlled by the CVCC control circuit of particular embodiments, and can include signal input portion A, transformer B, load portion C, CVCC control portion D, and signal collection portion E. Signal input portion A, transformer B, load portion C, and CVCC control portion D as shown in FIG. 3 may have a similar circuit structure as the flyback SMPS discussed above.

Signal collection portion E can collect the output signals of load portion C. Specifically, auxiliary winding $N_T$ coupled to secondary winding $N_S$ of the flyback converter can obtain output voltage information. Also, secondary-side output voltage $V_S$ obtained through dividing resistors $R_{11}$ and $R_{22}$ can be converted by voltage feedback module 201 to obtain output voltage feedback signal $V_{FB}$. In addition, primary-side current $I_S$ induced through current sense resistor $R_s$ can be converted by current feedback module 202 to obtain output current feedback signal $I_{FB}$.

Output current feedback signal $I_{FB}$ and output voltage feedback signal $V_{FB}$ can be input to current controller 301 and voltage controller 302, respectively. Current controller 301 can calculate a difference between output current feedback signal $I_{FB}$ and reference current $I_{ref1}$, to generate output error signal $V_{err}$. Also, voltage controller 302 can compare output voltage feedback signal $V_{FB}$ against reference voltage $V_{ref2}$, to generate control signal $V_{ctrl1}$.

Select controller 303 can select an operation mode of the flyback SMPS based on control signal $V_{ctrl1}$ and error signal $V_{err}$, and may generate constant voltage/constant current control signal $V_{comp}$. When control signal $V_{ctrl1}$ is at high level, the flyback SMPS may operate in a first operation mode (e.g., a constant current operation mode). When control signal $V_{ctrl1}$ is a pulse type of signal with a certain duty cycle, the flyback SMPS may operate in a second operation mode (e.g., a constant voltage operation mode).

PWM controller 205 can generate a PWM control signal based on constant voltage/constant current control signal $V_{comp}$ to control main switch $Q_M$. For example, when enable signal EN1 is inactive, the PWM control signal can be used to turn on main switch $Q_M$. Also, when enable signal EN1 is active, main switch $Q_M$ may remain off, in order to reduce power loss. Enable signal EN1 can be generated by comparing constant voltage/constant current control signal $V_{comp}$ against reference voltage $V_{ref1}$. Enable signal EN1 can be configured to represent for a load state (e.g., light load, no load, heavy load, etc.) of the main circuit. Constant voltage/constant current control signal $V_{comp}$ can be received by enable signal generating module 204 coupled to select controller 303. Therefore, when the load of the main circuit is reduced to a certain extent or even becomes no-load, main switch $Q_M$ of the flyback SMPS can be turned off to stop energy from being transferred from the input side, and thus to avoid power loss.

When control signal $V_{ctrl1}$ is at high level, select controller 303 can control the entire circuit operating in the first operation mode (e.g., a constant current operation mode). Select controller 303 can generate constant current control signal $V_{comp}$ based on error signal $V_{err}$. PWM controller 205 can receive constant current control signal $V_{comp}$ and generate the PWM control signal to control main switch $Q_M$, so as to maintain output current $I_{out}$ as substantially constant.

When control signal $V_{ctrl1}$ is a pulse signal with a certain duty cycle, select controller 303 can control the flyback SMPS to operate in a second operation mode (e.g., a constant voltage operation mode). Under this circumstance, select controller 303 can generate constant voltage control signal $V_{comp}$ based on error signal $V_{err}$. Also, PWM controller 205 can receive constant voltage control signal $V_{comp}$ and generate the PWM control signal. For example, when enable signal EN1 is inactive, main switch $Q_M$ can be turned on to maintain voltage $V_{out}$ as substantially constant. When first enable signal EN1 is active, main switch $Q_M$ may be off. That is, when the load of the main circuit is reduced to a light load or even becomes no-load, enable signal EN1 can be utilized to remain main switch $Q_M$ off to stop energy from being transferred from the input side to avoid associated power loss.

In particular embodiments, a CVCC control circuit can collect voltage and current signals through signal collection portion E, and generate control signal through CVCC control portion D to control main switch $Q_M$. In this way, the output voltage or current can be maintained as substantially constant with a relatively simple circuit structure also, when the CVCC control circuit is operating under a light load or even a no-load state, enable signal EN1 can be configured to turn off main switch $Q_M$ to stop energy from being transferred from the input side, thus avoiding associated power loss.

Figure 4:
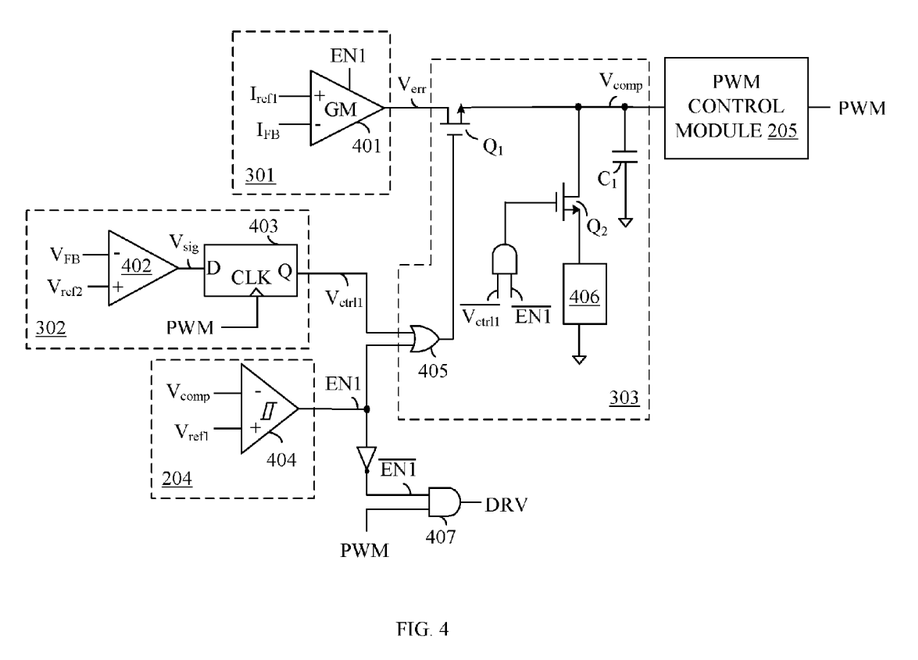
FIG. 4 is a schematic diagram of an example specific implementation of the CVCC control circuit shown in FIG. 3.

Referring now to FIG. 4, shown our specific example implementations and example operation procedures of the current controller, the voltage controller, the select controller, and the first enable signal generating module. Current controller 301 of the CVCC control circuit can include transconductance amplifier 401. A non-inverting input terminal of transconductance amplifier 401 can receive reference current $I_{ref1}$, an inverting input terminal can receive output current feedback signal $I_{FB}$, and an output terminal can output error signal $V_{err}$.

Voltage controller 302 of the CVCC control circuit can include comparator 402 and logic controller 403. A non-inverting input terminal of comparator 402 can receive reference voltage $V_{ref2}$, an inverting terminal can receive output voltage feedback signal $V_{FB}$, and an output terminal can output middle signal $V_{sig}$. Logic controller 403 can receive middle signal $V_{sig}$, and in one example the PWM control signal can be a clock signal. At each rising edge of the PWM control signal, control signal $V_{ctrl1}$ can be updated as necessary based on middle signal $V_{sig}$.

For example, at each rising edge of the PWM control signal, middle signal $V_{sig}$ can be sampled to decide if there is a change in its detected state (e.g., detected as a high or a low level based on appropriate thresholds). If there is no change in state the detected state of middle signal $V_{sig}$, control signal $V_{ctrl1}$ can be maintained in its same state. However, when middle signal $V_{sig}$ is detected or sampled as a different state, control signal $V_{ctrl1}$ can accordingly change on a next rising edge of the PWM control signal. First logic controller 403 can be implemented by a D type flip-flop, where input terminal D can receive middle signal $V_{sig}$, and terminal CLK can receive PWM control signal as its clock signal. Therefore, at each rising edge of the PWM control signal, the D flip-flop can effectively output middle signal $V_{sig}$ as control signal $V_{ctrl1}$.

Select controller 303 of the CVCC control circuit can include OR-gate 405, switch $Q_1$, switch $Q_2$, discharge circuit 406, and capacitor $C_1$, as shown in FIGS. 3 and 4. OR-gate 405 can receive control signal $V_{ctrl1}$, and enable signal EN1, and can provide an output to control switch $Q_1$. Enable signal EN1 can be generated by enable signal generating module 204. Enable signal generating module 204 can include hysteresis comparator 404. A non-inverting input terminal of hysteresis comparator 404 can receive reference voltage $V_{ref1}$, an inverting input terminal can receive constant voltage/constant current control signal $V_{comp}$, and an output terminal can output enable signal EN1.

A first input terminal of switch $Q_1$ can receive error signal $V_{err}$, and a second input terminal can be series connected to switch $Q_2$ and discharge circuit 406. For example, switch $Q_2$ may only be turned on when enable signal EN1 and control signal $V_{ctrl1}$ are both inactive. Otherwise, switch $Q_2$ may remain off. Also, one terminal of capacitor $C_1$ can be coupled to a common junction of switches $Q_1$ and $Q_2$, while the other terminal can be coupled to ground. The voltage across capacitor $C_1$ can be configured as constant voltage/constant current control signal $V_{comp}$. The discharging time of discharge circuit 406 can be constant or flexible. As such, discharging circuit 406 can be implemented by suitable components (e.g., a constant resistor, a variable resistor, a constant current source, or a variable current source, etc.).

FIG. 4 only shows and describes specific example implementations and operation procedure of current controller 301, voltage controller 302, select controller 303, and enable signal generating module 204. Other circuit structures like voltage feedback module 201 and current feedback module 202 are not shown. Voltage feedback module 201 and current feedback module 202 can be configured by sensors with conversion processing function and feedback function. Also, the data collection portion can have a same or a similar structure as described above, and PWM controller 205 can be configured by a PWM control circuit of a traditional SMPS.

One example operation procedure and operating principles of the CVCC control circuits in FIGS. 3 and 4 can be described below in conjunction with the signal waveform diagram shown in FIG. 5. When the main circuit is under a heavy-load condition, output voltage $V_{out}$ may decrease. Also, output voltage feedback signal $V_{FB}$ obtained by voltage feedback module 201 may be relatively low. Since reference voltage $V_{ref2}$ can be larger than output voltage feedback signal $V_{FB}$ during this time (e.g., between $t_2$ and $t_4$), middle signal $V_{sig}$ output by comparator 402 may remain at a high level. Consequently, control signal $V_{ctrl1}$ may also remain at a high level, and select controller 303 can control the flyback SMPS operating in the first operation mode (e.g., a constant current operation mode).

Under this circumstance, switch $Q_1$ may remain on and switch $Q_2$ may can remain off. Error signal $V_{err}$ output by current controller 301 can be utilized to charge capacitor $C_1$. When the output current of the main circuit is changing, output current feedback signal $I_{FB}$ may also change. Error signal $V_{err}$ may increase or decrease accordingly to cause the charging current for capacitor $C_1$ to increase or decrease. As such, constant current control signal $V_{comp}$ may change and this effect can be transferred to PWM controller 205. The PWM control signal generated by PWM controller 205 can control main switch $Q_M$, so as to maintain the output current as substantially constant.

For example, when the main circuit is under light load conditions, control signal $V_{ctrl1}$ can be a pulse signal with a certain duty cycle. Select controller 303 can control operation of the flyback SMPS in a second operation mode (e.g., a constant voltage operation mode). Under the constant voltage control mode, when enable signal EN1 is inactive, the PWM control signal can be configured to control main switch $Q_M$ to maintain output voltage $V_{out}$ of the flyback SMPS as substantially constant. When enable signal EN1 is active, main switch $Q_M$ may remain off. In practical applications, enable control signal EN1 can be inverted by an inverter, and inversion of enable control signal EN1 and the PWM control signal can be input to two terminals of AND-gate 407. An output signal of AND-gate 407 can be configured as control signal DRV for main switch $Q_M$.

Figure 5:
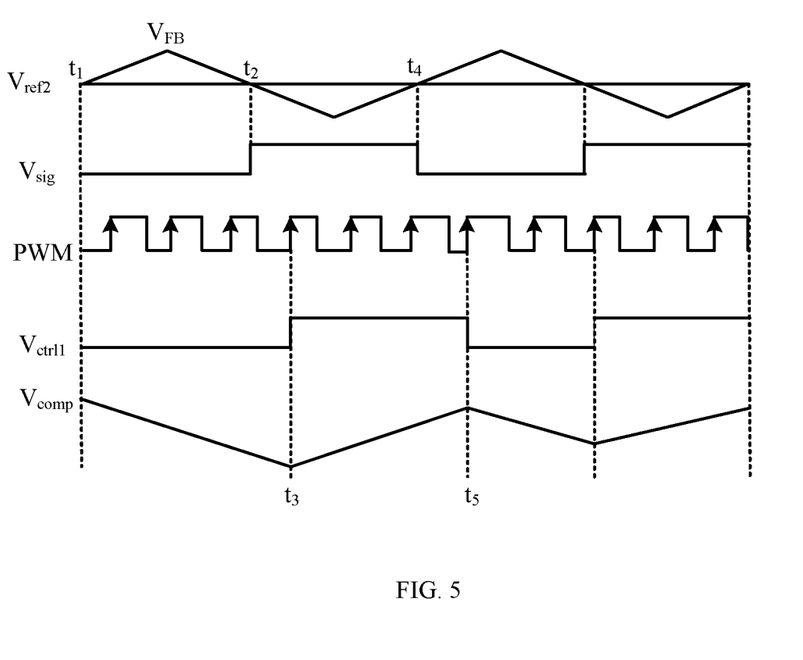
FIG. 5 is an operation waveform diagram of the CVCC control circuit shown in FIG. 4 with a light load.

In the constant voltage mode, when the load is relatively light, enable signal EN1 may remain at a low level, and the operation waveform diagram of the CVCC control circuit can be seen in FIG. 5. Since enable signal EN1 may be at a low level inactive state, switches $Q_1$ and $Q_2$ may only be controlled by control signal $V_{ctrl1}$. During the period of $t_1$ to $t_2$, output voltage feedback signal $V_{FB}$ can be larger than reference voltage $V_{ref2}$, so middle signal $V_{sig}$ generated by comparator 402 can be low. Also, control signal $V_{ctrl1}$ can be low to control switch $Q_1$ to remain off, and switch $Q_2$ to remain on. In addition, capacitor $C_1$ may discharge through discharge circuit 406, and constant voltage control signal $V_{comp}$ may decrease accordingly. Further, the duty cycle of the corresponding PWM control signal may also decrease as well as output voltage feedback signal $V_{FB}$.

From time $t_2$ on, output voltage feedback signal $V_{FB}$ may be smaller than reference voltage $V_{ref2}$, and middle signal $V_{sig}$ output by comparator 402 may go to a high level. By this time, since the rising edge of the PWM control signal has not yet occurred, control signal $V_{ctrl1}$ can remain low. Thus, the switch states of switches $Q_1$ and $Q_2$ may remain the same. Also, constant voltage control signal $V_{comp}$ can continue decreasing until time $t_3$. At time $t_3$, the rising edge of the PWM control signal can arrive, and control signal $V_{ctrl1}$ output by D flip-flop may thus go high.

After control signal $V_{ctrl1}$ goes to high level, switch $Q_1$ can be turned on and switch $Q_2$ can be turned off. Also, capacitor $C_1$ can be charged by output current feedback signal $I_{FB}$ based on error signal $V_{err}$. Thus, constant voltage control signal $V_{comp}$ may increase, and the duty cycle of the PWM control signal may also increase as well as output voltage feedback signal $V_{FB}$. By repeating such, output voltage $V_{out}$ of the main circuit can be substantially constant.

When the load of the main circuit further decreases, enable signal EN1 can be a pulse signal. The waveform diagram of the CVCC control circuit under this circumstance can be shown as FIG. 6. As the load becomes lighter, output voltage $V_{out}$ of the main circuit may increase. Also, output voltage feedback signal $V_{FB}$ is relatively large and may be larger than reference voltage $V_{ref2}$. Thus, control signal $V_{ctrl1}$ output by comparator 402 can remain low, and the switch states of switches $Q_1$ and $Q_2$ may only be determined by enable signal EN1.

Figure 6:
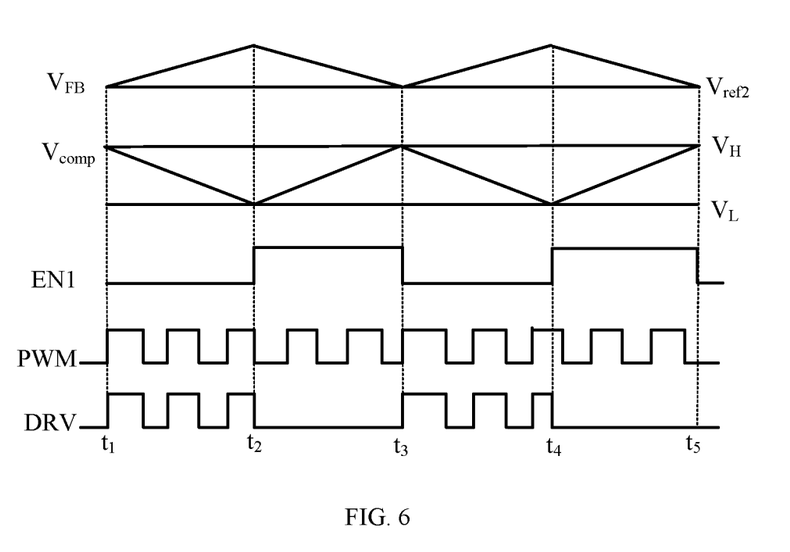
FIG. 6 is an operation waveform diagram of the CVCC control circuit shown in FIG. 4 with an even lighter load.

During the period of $t_1 \sim t_2$, constant voltage control signal $V_{comp}$ may decrease to lower limit voltage $V_L$ from upper limit voltage $V_H$, enable signal EN1 can remain low, and the output of OR-gate 405 can also remain low. Also, switch $Q_1$ can remain off and switch $Q_2$ can remain on. Capacitor $C_1$ can discharge through discharge circuit 406, and constant voltage control signal $V_{comp}$ may decrease slowly. Therefore, control signal DRV of main switch $Q_M$ can be kept consistent with the PWM control signal, and output voltage feedback signal $V_{FB}$ may increase gradually.

At time $t_2$, constant voltage control signal $V_{comp}$ may decrease to lower limit voltage $V_L$, and enable signal EN1 output by hysteresis comparator 404 may go high. Also, the output of OR-gate 405 may also go high to turn on switch $Q_1$. At the same time, switch $Q_2$ can be turned off. As enable signal EN1 goes high, the transconductance of transconductance amplifier 401 may decrease to generate a smaller error signal $V_{err}$.

During the period of $t_2 \sim t_3$, capacitor $C_1$ can receive error signal $V_{err}$ and can be charged. The charging time can be extended since error signal $V_{err}$ is smaller or less than, and constant voltage control signal $V_{comp}$ may increase gradually. Control signal DRV of main switch $Q_M$ can remain low, so main switch $Q_M$ can remain off, and output voltage feedback signal $V_{FB}$ can decrease gradually.

The illustrated implementations of all the example modules or circuits can be replaced by other circuit structures or other components with the same or a similar function. For example, the switches of the CVCC control circuit can be configured by MOSFET transistors, or any other appropriate transistors or switching devices. The CVCC control circuit of particular embodiment can control the circuit operation mode by applying a select controller. When the load of the main circuit is reduced to a certain predetermined level, enable signal EN1 can maintain main switch $Q_M$ at an off state to stop energy from being transferred from the input side of the main, thus avoiding associated power loss.

In particular embodiments, output voltage feedback signal $V_{FB}$ can decrease to reference voltage $V_{ref2}$ when constant voltage control signal $V_{comp}$ rises to upper limit voltage $V_H$. However, if the load becomes lighter, and possibly becomes no-load, output voltage feedback signal $V_{FB}$ may not reduce to reference voltage $V_{ref2}$. Yet when constant voltage control signal $V_{comp}$ has risen to upper limit voltage $V_H$ and enable signal EN1 has gone low, output voltage feedback signal $V_{FB}$ may start to gradually increase as control signal DRV of main switch $Q_M$ can remain consistent with the PWM control signal. In order to extend the off time of main switch $Q_M$ when the main circuit is under a light load or no-load state, adjustments on the CVCC control circuit described above can be made, as will be discussed further below with reference to FIG. 7.

Figure 7:
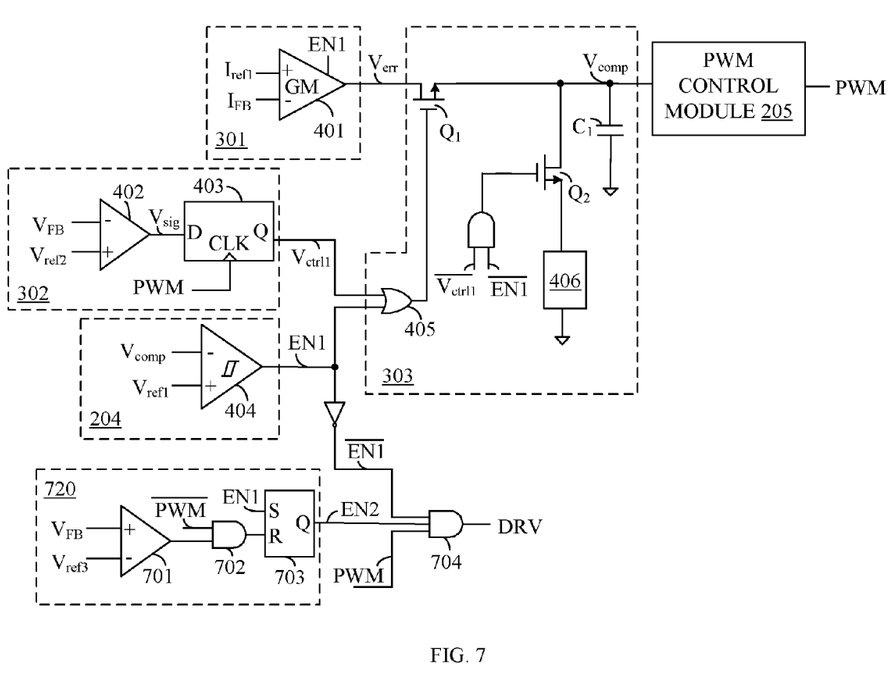
FIG. 7 is a schematic diagram of another example specific implementation of the CVCC control circuit shown in FIG. 3.

Referring now to FIG. 7, compared to the above described example (see, e.g., FIG. 4), the present example CVCC can convert two-input AND-gate 407 to three-input AND-gate 704. Also, two input signals of three-input AND-gate 704 can remain unchanged to be an inverted version of enable signal EN1, and the PWM control signal. The third input terminal of AND-gate 704 can receive enable signal EN2 generated by enable signal generating module 720. Enable signal generating module 720 can include comparator 701, AND-gate 702 and RS flip-flop 703, as shown in FIG. 7.

A non-inverting input terminal of comparator 701 can receive output voltage feedback signal $V_{FB}$, an inverting input terminal can receive reference voltage $V_{ref3}$, and an output terminal can be coupled to a first input terminal of AND-gate 702. A second input terminal of first AND-gate 702 can receive an inverted version of the PWM control signal, and an output terminal can be coupled to a reset terminal of RS flip-flop 703. A set terminal of RS flip-flop 703 can receive enable signal EN1, and an output terminal can output enable signal EN2.

When enable signal EN2 is active high and enable signal EN1 is inactive low, the PWM control signal can be used to control main switch $Q_M$. When enable signal EN2 is inactive low or enable signal EN1 is active high, main switch $Q_M$ may remain off. As shown in FIG. 7, enable signal EN1 can be used to obtain an inverted version of signal enable signal EN1 through an inverter. The inverted version of enable signal, enable signal EN2, and the PWM control signal can be input to terminals of AND-gate 704. The output signal of AND-gate 704 can be configured as control signal DRV for main switch $Q_M$.

Figure 8:
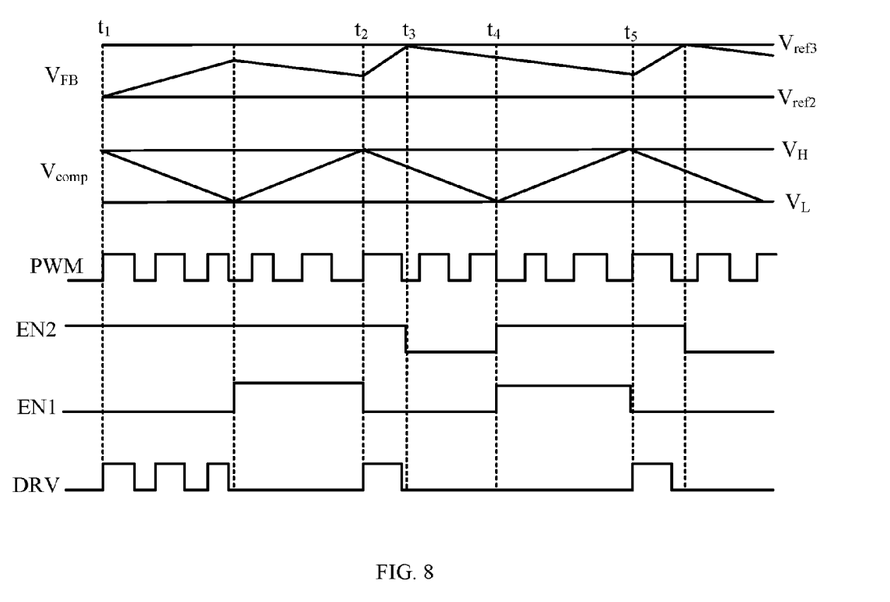
FIG. 8 is an operation waveform diagram of the CVCC control circuit shown in FIG. 7.

Example operation procedure and operation principles of the example CVCC control circuit of FIG. 7 can be described in detail below in conjunction with the specific waveform diagram. Referring now to FIG. 8, during the period of $t_1 \sim t_2$, output voltage feedback signal $V_{FB}$ may be smaller than reference voltage $V_{ref3}$, so the output signal of second comparator 701 can be at a low level to cause enable signal EN2 to go high. During this period, the operation procedure and operation principle of the CVCC control circuit can be substantially the same as the CVCC control circuit shown in FIG. 4.

When the load of the main circuit is even lighter than in the example operation discussed above, or even becomes no-load, output voltage $V_{out}$ of the main circuit may increase to cause output voltage feedback signal $V_{FB}$ to not fully decrease to second reference voltage $V_{ref2}$ by time $t_2$. However, at time $t_2$, constant voltage control signal $V_{comp}$ may already have risen to upper limit voltage $V_H$ to result in enable signal EN1 going low. Thus, the PWM control signal can still control main switch $Q_M$. From time $t_2$ on, output voltage feedback signal $V_{FB}$ can start rising, and constant voltage control signal $V_{comp}$ may decrease due to the discharging of capacitor $C_1$.

At time $t_3$, output voltage feedback signal $V_{FB}$ may have risen to reference voltage $V_{ref3}$, so the output signal of comparator 701 may go high and be input to first AND-gate 702. At the same time, PWM control signal may be at a low level, AND-gate 702 can generate a high signal to the reset terminal of RS flip-flop 703 to reset enable signal EN2 to low. From time $t_3$ on, control signal DRV of main switch $Q_M$ may go low to turn off main switch $Q_M$. Also, output voltage feedback signal $V_{FB}$ may decrease gradually as the energy transferred from the input side of the main circuit is stopped.

During the period of $t_3 \sim t_4$, enable signal EN2 can stay at a low level. Since enable signal EN1 remains at a low level, the discharging of capacitor $C_1$ may cause constant voltage control signal $V_{comp}$ to continue to decrease. At time $t_4$, constant voltage control signal $V_{comp}$ can decrease to lower limit voltage $V_L$ to cause enable signal EN1 to go high. Because enable signal EN1 can be input to the set terminal of RS flip-flop 703, enable signal EN2 output by RS flip-flop 703 can go high.

During the period of time $t_4 \sim t_5$, as enable signal EN1 goes high, main switch $Q_M$ can remain off. Also, output voltage feedback signal $V_{FB}$ may continue to decrease, capacitor $C_1$ may begin to charge, and constant voltage control signal $V_{comp}$ may start rising until reaching upper limit voltage $V_H$ at time $t_5$. When the load of the main circuit is reduced to a certain extent or even becomes no-load, the example CVCC control circuit can turn off main switch $Q_M$ by enable signal EN2 to stop energy from being transferred from the input side, thus avoiding associated power loss.

In particular embodiments, the output voltage signal can be collected through auxiliary winding $N_T$ to obtain output voltage feedback signal $V_{FB}$. Since output voltage $V_s$ of auxiliary winding $N_T$ may be a discontinuous signal, output voltage feedback signal $V_{FB}$ may be pulled down to avoid the entire circuit possibly suffering from undesirable effects due to signal discontinuity, such as entering a locked state. In view of this, particular embodiments can also provide another specific implementation of the CVCC control circuit, as will be discussed below with reference to FIG. 9.

Figure 9:
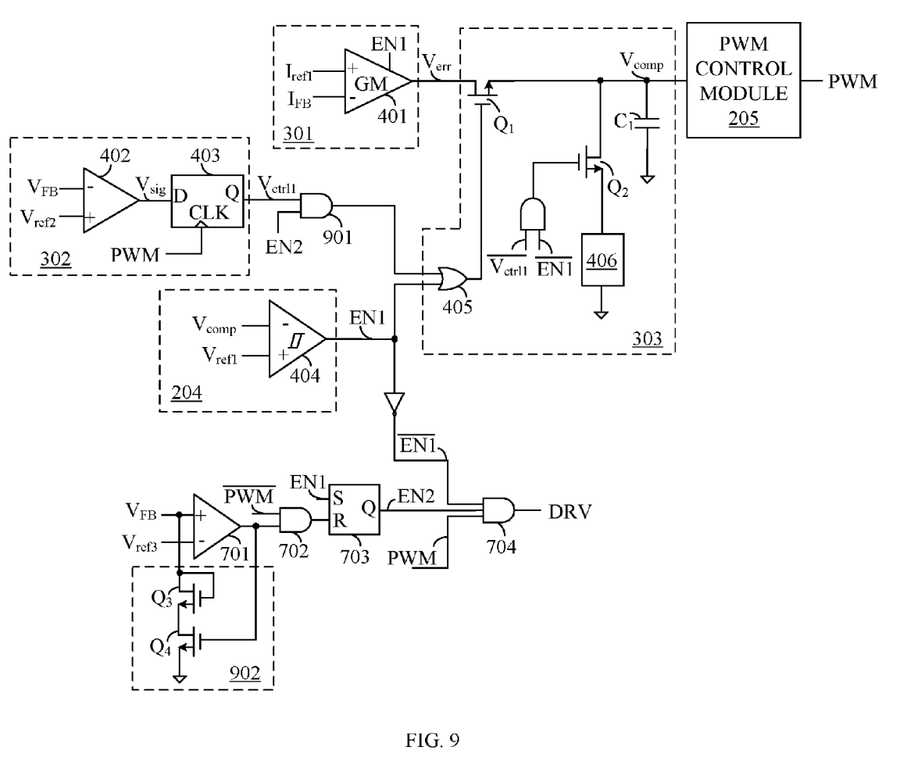
FIG. 9 is another example specific implementation of the CVCC control circuit shown in FIG. 3.

Referring now to FIG. 9, the example CVCC control circuit can also include AND-gate 901 and recovery circuit 902, as compared to the above example. AND-gate 901 can receive control signal $V_{ctrl1}$ and enable signal EN2. Also, an output terminal of AND-gate 901 can connect to an input terminal of OR-gate 405 of select controller 303. When the output of comparator 701 is high, recovery circuit 902 can pull down output voltage feedback signal $V_{FB}$. As a result, the output of comparator 701 can quickly recover to a low state.

In this example, recovery circuit 902 can include switches $Q_3$ and $Q_4$. A first terminal of switch $Q_3$ can connect to the non-inverting input terminal of comparator 701. A second terminal of switch $Q_3$ can be series connected with switch $Q_4$ to ground. Also, a control terminal of switch $Q_3$ can connect to a first input terminal thereof, in a diode-connected transistor configuration. A control terminal of switch $Q_4$ can connect to the output terminal of comparator 701.

When output voltage feedback signal $V_{FB}$ is larger than reference voltage $V_{ref3}$, the output of comparator 701 can go high to turn on switch $Q_4$. Thus, output voltage feedback signal $V_{FB}$ can be pulled down by switches $Q_3$ and $Q_4$ to result in the output of comparator 701 going low again. Therefore, when output voltage feedback signal $V_{FB}$ is larger than reference voltage $V_{ref3}$, the output of comparator 701 can be a single pulse signal.

At the same time, since output voltage feedback signal $V_{FB}$ can be pulled down, it may be smaller than reference voltage $V_{ref2}$. Control signal $V_{ctrl1}$ output by voltage controller 302 can go high to ensure that switch $Q_1$ cannot be turned on by mistake. Also, switch $Q_2$ cannot be turned off by mistake. Control signal $V_{ctrl1}$ and enable signal EN2 can be coupled to the input terminal of AND-gate 901. When control signal $V_{ctrl1}$ goes high because output voltage feedback signal $V_{FB}$ is pulled down, comparator 701 can output a low level to keep enable signal EN2 at a low level. Thus, the output of AND-gate 901 can remain inactive low, and may be input to OR-gate 405.

In particular embodiments, output voltage feedback signal $V_{FB}$ can be pulled down via AND-gate 901 and recovery circuit 902 to avoid the entire circuit entering a locked state. In addition, when the output of the SMPS is controlled as substantially steady, main switch $Q_M$ can be controlled along with the load change to avoid power losses, as discussed above.

In one embodiment, a method can include: (i) obtaining an output current feedback signal and an output voltage feedback signal; (ii) generating a constant voltage/constant current control signal based on the output current feedback signal and the output voltage feedback signal; (iii) generating a first enable signal based on the constant voltage/constant current control signal and a first reference voltage; (iv) controlling a main switch of the flyback SMPS based on the first enable signal, where the main switch is turned off by the first enable signal when the first enable signal is active; (v) generating, in a first operation mode, a PWM control signal based on the constant current control signal to control the main switch to maintain substantially constant output current; and (vi) generating, in a second operation mode, the PWM control signal based on the constant voltage control signal, where the PWM control signal is used to control the main switch when the first enable signal is inactive.

Figure 10:
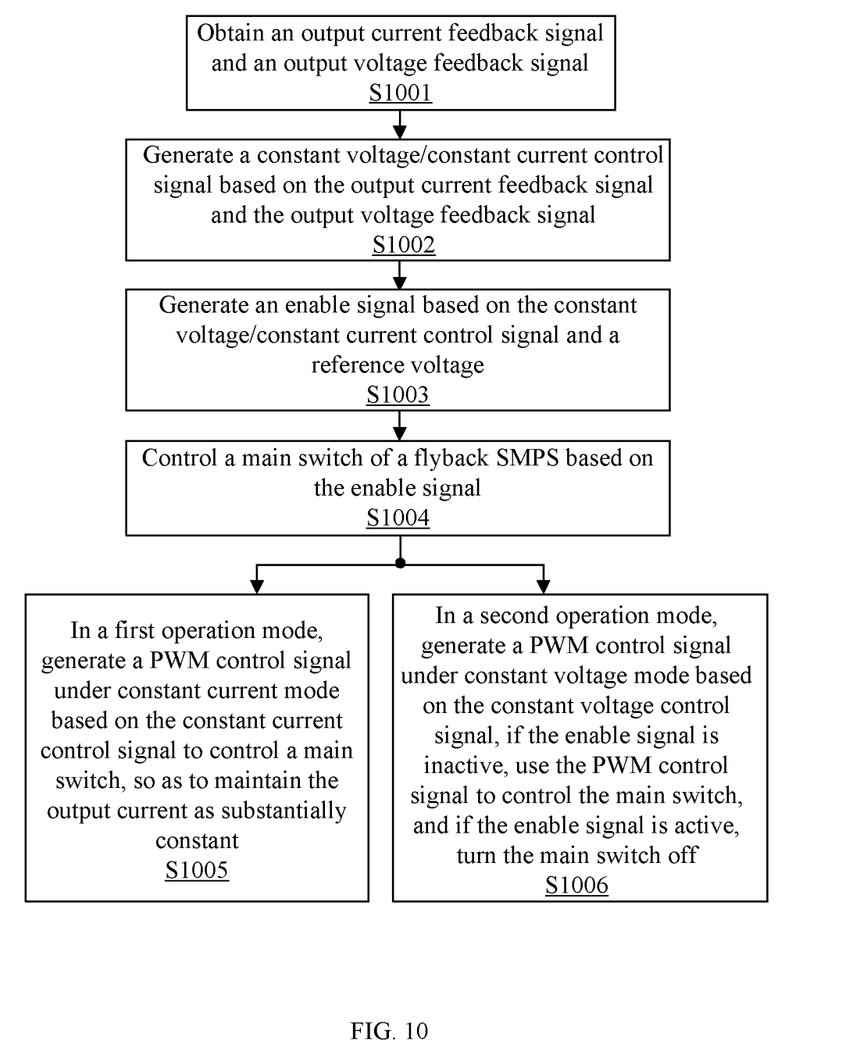
FIG. 10 is a flow diagram of an example CVCC method with improved load regulation, in accordance with embodiments of the present invention.

Referring now to FIG. 10, particular embodiments can provide a CVCC control method with improved load regulation for flyback SMPS. For example, the CVCC control method can include obtaining output current feedback and output voltage feedback signals at S1001. For example, a signal collection circuit can be configured to collect output current and output voltage signals of the SMPS. Also, voltage and current feedback modules can process the output current and voltage signals to obtain output current and voltage feedback signals.

At S1002, a constant voltage/constant current control signal can be generated based on the output current feedback signal and the output voltage feedback signal. At S1003, an enable signal can be generated based on the constant voltage/constant current control signal and a reference voltage. At S1004, a main switch of the flyback SMPS can be controlled based on the enable signal.

At S1005, in the first operation mode, a PWM control signal under constant current state can be generated based on the constant current control signal to control the main switch, so as to remain the output current as substantially constant. At S1006, in the second operation mode, a PWM control signal under constant voltage state can be generated based on the constant voltage control signal. If the enable signal is active, the main switch can be turned off by the enable signal. If the enable signal is inactive, the main switch can be controlled (e.g., turned off/on) by the PWM control signal. Further, the enable signal can be configured to represent a load state of the main circuit. For example, when under light load or no-load condition, the main switch can be turned off to stop energy from being transferred from the input side, thus avoiding associated power loss.

In addition, the above described control method can also include generating an error signal and a control signal based on the output current feedback signal and the output voltage feedback signal, and calculating the difference between the output current feedback signal and a reference current to obtain the error signal. Also, the output voltage feedback signal can be compared against a second reference voltage to generate the control signal. Also, the operation mode of the flyback SMPS can be selected based on the error signal and the control signal.

When the SMPS is working operates in the second operation mode, the above described control method can also include obtaining a second enable signal based on the output voltage feedback signal, a third reference voltage, the PWM control signal, and the first enable signal. When the second enable signal is active and the first enable signal is inactive, the main switch can be controlled based on the PWM control signal. When the second enable signal is inactive or the first enable signal is active, the main switch can be turned off.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A constant voltage/constant current (CVCC) control circuit for regulation of a load of a flyback switch mode power supply (SMPS), the CVCC control circuit comprising:
   a) a voltage feedback circuit configured to generate an output voltage feedback signal;
   b) a current feedback circuit configured to generate an output current feedback signal;
   c) a control signal generating circuit configured to receive said output voltage feedback signal and said output current feedback signal, to control whether said flyback SMPS operates in a constant voltage mode or a constant current mode based on a first control signal and an error signal, and to generate a CVCC control signal;
   d) a first enable signal generating circuit configured to compare a first reference voltage and said CVCC control signal to generate a first enable signal;
   e) a pulse-width modulation (PWM) controller configured to generate a PWM control signal based on said CVCC control signal to control a main switch of said flyback SMPS, wherein said PWM control signal is configured to control operation of said main switch when said first enable signal is inactive and a second enable signal is active, and wherein said main switch remains off when said first enable signal is active or said second enable signal is inactive; and
   f) a second enable signal generating circuit configured to receive said output voltage feedback signal and a second reference voltage, and to generate said second enable signal, wherein said PWM control signal is configured to control said operation of said main switch when said CVCC control signal is higher than said first reference voltage and said output voltage feedback signal is less than said second reference voltage, and wherein said main switch is controlled to be off when said CVCC control signal is less than said first reference voltage or said output voltage feedback signal is higher than said second reference voltage.

2. The CVCC control circuit of claim 1, wherein said control signal generating circuit comprises:
   a) a current controller configured to calculate a difference between said output current feedback signal and a first reference current to generate said error signal; and
   b) a voltage controller configured to compare said output voltage feedback signal against a third reference voltage to generate said first control signal.

3. The CVCC control circuit of claim 2, wherein said voltage controller comprises:
   a) a first comparator having a non-inverting input terminal configured to receive said third reference voltage, an inverting input terminal configured to receive said output voltage feedback signal, and an output terminal configured to output a middle signal; and
   b) a logic controller configured to receive said middle signal, and to generate said first control signal, wherein said PWM control signal is used as a clock signal for said logic controller.

4. The CVCC control circuit of claim 1, wherein said first enable signal generating circuit comprises a hysteresis comparator having a non-inverting input terminal configured to receive said first reference voltage, an inverting input terminal configured to receive said CVCC control signal, and an output terminal configured to output said first enable signal.

5. The CVCC control circuit of claim 1, further comprising a select controller having:
   a) an OR-gate configured to receive said first control signal and said first enable signal;
   b) a first switch, wherein a control terminal of said first switch is coupled to an output terminal of said OR-gate, and a first terminal of said first switch is configured to receive said error signal;
   c) a second switch coupled to said first switch and a discharge circuit, wherein said second switch is configured to turn on when said first enable signal and said first control signal are inactive; and
   d) a capacitor coupled to ground and a common junction of said first switch and said second switch, wherein a voltage across said capacitor is configured as said CVCC control signal.

6. The CVCC control circuit of claim 1, wherein said second enable signal generating circuit comprises:
   a) a first comparator configured to receive said output voltage feedback signal and said second reference voltage;
   b) a first AND-gate coupled to receive an output of said first comparator and an inverted version of said PWM control signal; and
   c) an RS flip-flop, wherein a reset terminal of said RS flip-flop is coupled to an output of said first AND-gate, a set terminal of said RS flip-flop is coupled to said first enable signal, and an output terminal of said RS flip-flop is configured to output said second enable signal.

7. The CVCC control circuit of claim 6, further comprising:
   a) a second AND-gate configured to receive said first control signal and said second enable signal, and having an output coupled to said control signal generating circuit; and
   b) a recovery circuit configured to pull down said output voltage feedback signal to fast recover an output of said second comparator to a low level when said output of said second comparator is active.

8. The CVCC control circuit of claim 1, wherein said first enable signal is active when said load is in a light load state.

9. The CVCC control circuit of claim 1, wherein said first enable signal is active when said load is in a no load state.

10. The CVCC control circuit of claim 1, wherein said flyback SMPS operates in said constant current mode when said first control signal comprises a fixed high level signal.

11. The CVCC control circuit of claim 1, wherein said flyback SMPS operates in said constant voltage mode when said first control signal comprises a pulsed signal.

12. The CVCC control circuit of claim 1, wherein said voltage feedback circuit comprises an auxiliary winding.

13. A constant voltage/constant current (CVCC) control method for regulating a load of a flyback switch mode power supply (SMPS), the method comprising:
   a) obtaining an output current feedback signal and an output voltage feedback signal;
   b) generating a CVCC control signal based on said output current feedback signal and said output voltage feedback signal;
   c) generating a first enable signal based on said CVCC control signal and a first reference voltage;
   d) generating a second enable signal based on said output voltage feedback signal and a second reference voltage;
   e) controlling operation of a main switch of said flyback SMPS based on said first and second enable signals, wherein said main switch is turned off by said first enable signal when said first enable signal is active or said second enable signal is inactive;
   f) selecting one of a constant current mode and a constant voltage mode of said flyback SMPS based on an error signal and a first control signal;
   g) generating, in said constant current mode, a pulse-width modulation (PWM) control signal based on said CVCC control signal to control said main switch to maintain substantially constant output current; and
   h) generating, in said constant voltage mode, said PWM control signal based on said CVCC control signal, wherein said PWM control signal is used to control said main switch when said first enable signal is inactive and said second enable signal is active, wherein said PWM control signal is configured to control operation of said main switch when said CVCC control signal is higher than said first reference voltage and said output voltage feedback signal is less than said second reference voltage, and wherein said main switch is controlled to be off when said CVCC control signal is less than said first reference voltage or said output voltage feedback signal is higher than said second reference voltage.

14. The method of claim 13, further comprising:
   a) generating said error signal by calculating a difference between said output current feedback signal and a first reference current; and
   b) generating said first control signal by comparing said output voltage feedback signal against a third reference voltage.

15. The method of claim 13, further comprising
   a) obtaining said second enable signal based on said PWM control signal and said first enable signal.

16. The method of claim 13, wherein said first enable signal is active when said load is in a light load state.

17. The method of claim 13, wherein said first enable signal is active when said load is in a no load state.

18. The method of claim 13, wherein said flyback SMPS operates in said constant current mode when said first control signal comprises a fixed high level signal.

19. The method of claim 13, wherein said flyback SMPS operates in said constant voltage mode when said first control signal comprises a pulsed signal.

20. The method of claim 13, wherein said obtaining said output voltage feedback signal comprises using an auxiliary winding.

* * * * *